(12) United States Patent
Shimoji et al.

(10) Patent No.: US 6,435,728 B2
(45) Date of Patent: Aug. 20, 2002

(54) OPTICAL CONNECTOR HOUSING, OPTICAL CONNECTOR USING THE OPTICAL CONNECTOR HOUSING, AND CONNECTION STRUCTURE BETWEEN AN OPTICAL CONNECTOR USING THE SAME OPTICAL CONNECTOR HOUSING AND AN OPTICAL COMPONENT

(75) Inventors: Naoko Shimoji; Jun Yamakawa; Masayuki Iwase, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/883,314

(22) Filed: Jun. 19, 2001

Related U.S. Application Data

(63) Continuation of application No. PCT/JP00/01541, filed on Mar. 14, 2000.

(30) Foreign Application Priority Data

Oct. 29, 1999 (JP) .............................. 11-308987

(51) Int. Cl.[7] ................................................ G02B 6/38
(52) U.S. Cl. ............................. 385/56; 385/59; 385/76
(58) Field of Search .......................... 385/56, 59, 60, 385/72, 78, 88, 76

(56) References Cited

U.S. PATENT DOCUMENTS 6,095,695 A * 8/2000 Ohtsuka et al. ............... 385/72

FOREIGN PATENT DOCUMENTS

| JP | 56-156018 | 4/1980 |
| JP | 5-33104 | 4/1993 |
| JP | 5313041 | 11/1993 |

* cited by examiner

*Primary Examiner*—Phan T. H. Palmer
(74) *Attorney, Agent, or Firm*—Oblon, Spivak, McClelland, Maier & Neustadt, P.C.

(57) ABSTRACT

An optical connector housing having arm portions extending from both end sides of the face of the base end side. A space placed between the arm portions is constituted as ferrule accommodation space. An engaging portion which is engaged in an object to be connected is formed at the tip end side of the respective arm portions. A surface of an angle widening drive cam, which widens the arm portions when the ferrule is drawn to the face of the base end side, protrudes from and is formed on the inner wall of the arm portions extending from the position of the rear end face of the ferrule accommodated in the accommodation space to the base end side of the optical connector housing.

25 Claims, 11 Drawing Sheets

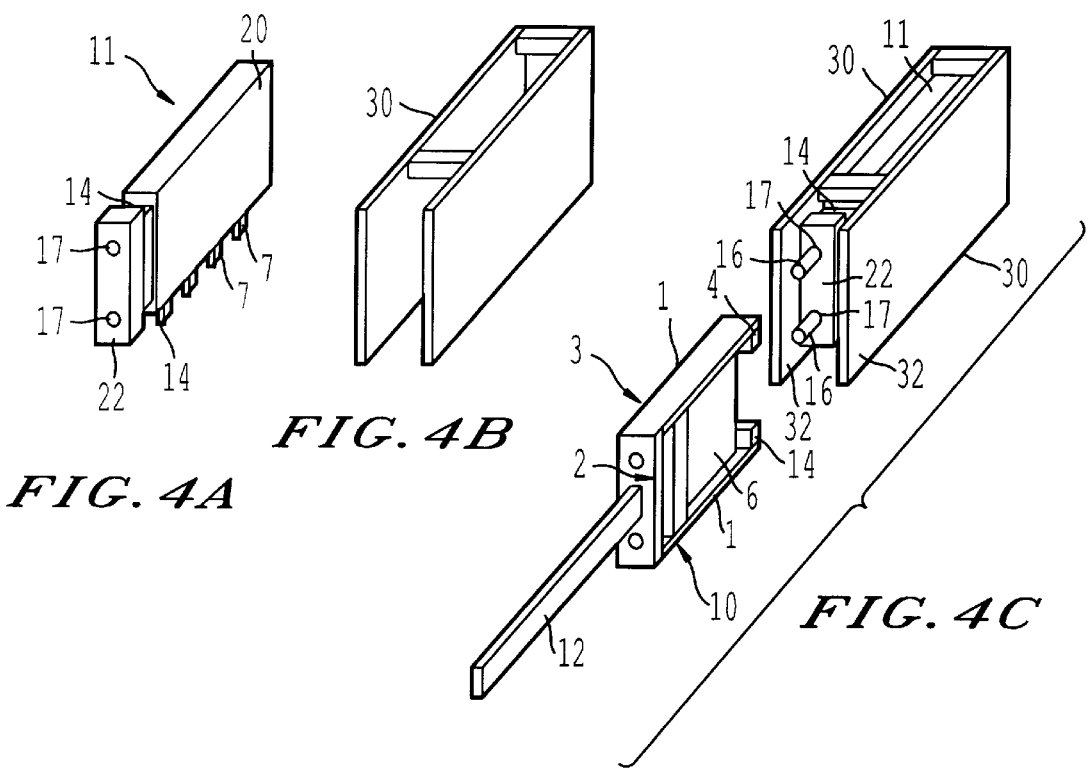
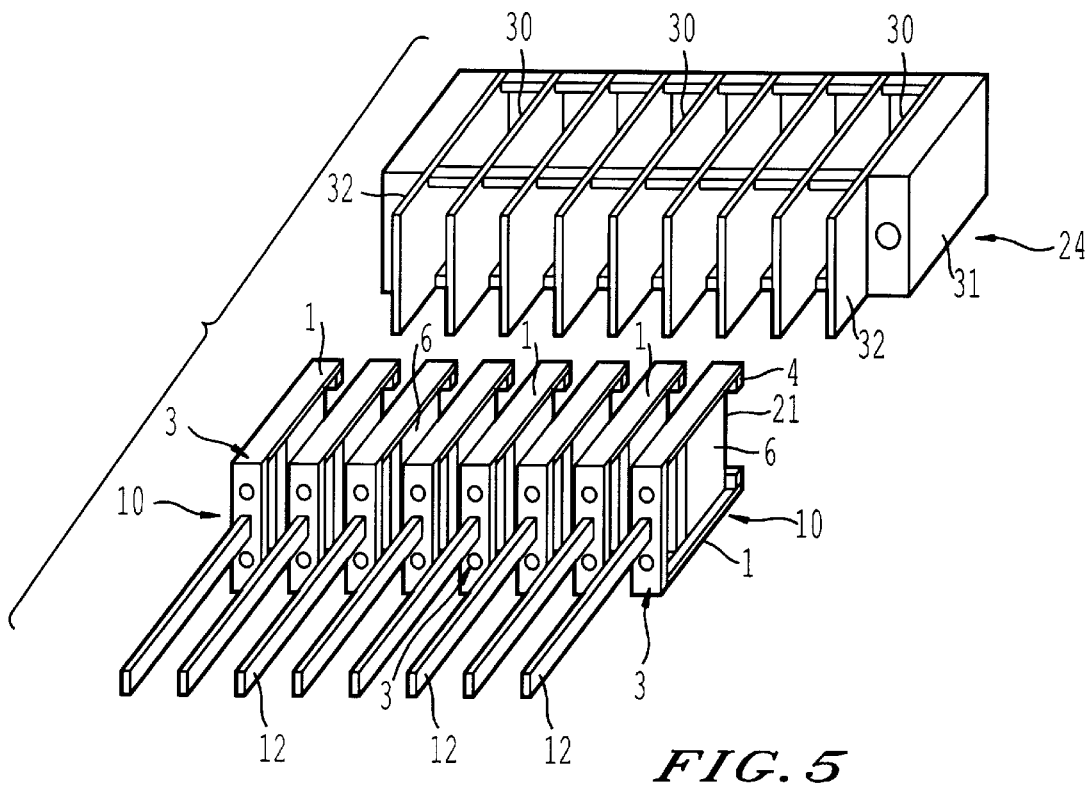

OPTICAL CONNECTOR HOUSING, OPTICAL CONNECTOR USING THE OPTICAL CONNECTOR HOUSING, AND CONNECTION STRUCTURE BETWEEN AN OPTICAL CONNECTOR USING THE SAME OPTICAL CONNECTOR HOUSING AND AN OPTICAL COMPONENT

CROSS-REFERENCE TO RELATED APPLICATION

The present application claims priority under 35 U.S.C. §119 to Japanese Patent Application No.11-308987, filed Oct. 29, 1999. Further, the present application claims priority under 35 U.S.C. §120 to International Application No. PCT/JP00/01541, filed Mar. 14, 2000, entitled "OPTICAL CONNECTOR HOUSING, OPTICAL CONNECTOR USING THE OPTICAL CONNECTOR HOUSING, AND CONNECTION STRUCTURE BETWEEN AN OPTICAL CONNECTOR USING THE SAME OPTICAL CONNECTOR HOUSING AND AN OPTICALCOMPONENT." The contents of these applications are incorporated herein by reference in their entirety.

BACKGROUND OF THE INVENTION

1. Field of the Invention

The present invention relates to an optical connector housing used for detachably connecting an optical connector mainly employed in optical transmissions and an optical component, an optical connector using the same optical connector housing, and a structure for connecting between an optical connector using the optical connector housing and an optical component.

2 Discussion of the Background

Recently, optical transmissions using optical fibers have been frequently employed, wherein high bit rate mounting of optical fibers is demanded. To meet the requirements of high bit rate mounting of optical fibers, studies and research have been carried out with respect to downsizing of optical connectors used to connect optical fibers and high bit rate mounting of optical modules, etc.

An MU type connector is one-fourth the size in cross-sectional area in comparison to the conventional SC type connectors. Further, recently, an MT type optical connector has been widely utilized, in which multiple optical fibers are disposed and fixed.

As shown in FIG. 15, this type of MT optical connector is formed so that an optical fiber tape ribbon 12 in which a plurality of optical fibers are disposed in parallel are inserted in a ferrule 6. In the drawing, 13 indicates a boot which protect the optical fiber tape ribbon 12, and 19 indicates a flange portion of the ferrule 6. A plurality of optical fiber insertion holes (not illustrated) are formed in the ferrule 6. Respective optical fibers of the optical fiber tape ribbon 12 are inserted into these respective optical fiber insertion holes while the tip ends of these optical fibers are exposed to the connection end face 21 of the ferrule 6.

As a means for connecting such optical fibers to each other, as shown in FIG. 14, a method has been proposed, in which, using an adapter 35 having a plurality of optical connector insertion holes 36, optical connectors 10 are inserted from both directions of the optical connector insertion holes 36 and connected to each other. As the proposed method, there is one which is disclosed in an extract B-10-34 of the 1997 Transmission Society Meeting of the Electronic Information Transmission Society.

In the proposed method, an optical connector housing 3 is provided at the optical connector 10 at one side (the left side of the drawing) of the optical connectors to be connected, thereby constituting an optical connector 10(10a) having an optical connector housing 3. The optical connector 10a and another optical connector 10b (the right side in the drawing) not provided with the optical connector housing 3 are connected to each other in an optical connector insertion hole 36, utilizing the optical connector housing 3. The optical connector housing 3 has arm portions 1 each extending from both side ends of the face (base end face) 2 at the base side, and the space put between the arm portions 1 is constituted as accommodation space of the ferrule 6 of the optical connector 10. A claw portion 4 is formed at the tip end side of the respective arm portions 1, and the respective tip ends of the arm portions 1 are constituted as a wedge-like latch structure.

In the optical connector 10a provided with the optical connector housing 3, a spring 5 is provided so as to extend from the rear end face 18 of the ferrule 6 to the face at the base end side of the optical connector housing 3. The spring 5 presses the ferrule 6 of the optical connector 10a against the optical connector 10 being an object to which the ferrule 6 is connected. The respective tip ends of the arm portions 1 of the optical connector housing 3 is provided so as to extend beyond the connection end face 21 of the ferrule 6 outwardly. The claw portions 4 at the tip ends of the arm portions 1 are caught by the flange portion 19 of the optical connector 10b illustrated at the right side in the drawing, whereby the optical connectors 10 are coupled to each other.

When attaching and detaching the optical connector 10, that is, connecting and disconnecting the optical connectors 10, a specified tool or fixture exclusively used for connection and disconnection is used. For example, when the optical connectors 10 are connected to each other, the right side optical connector 10b held by the fixture is pressed into the optical connector housing 3 and is connected to the left side optical connector 10a. Also, when disconnecting the optical connectors 10 from each other, the claw portions 4 of the left side optical connector 10a, which is caught by the flange portion 19 of the right side optical connector 10b, is removed by a wedge, and the optical connector 10b is pulled out, whereby the optical connectors 10a and 10b are disconnected from each other. In the case where the respective optical connectors 10 are inserted into the respective optical connector insertion holes 36, and connection of the optical connectors 10 is completed, the optical connectors 10 connected to each other are caused to overlap each other in the vertical direction of the drawing and they are disposed and accommodated.

However, as described, an exclusive attaching and detaching tool is required to connect the optical connectors 10 to each other and to disconnect the same from each other. Such an attaching and detaching tool will be used less in line with advances in high integrated optical connectors. Also, in the case where the optical connectors are connected to and disconnected from each other by utilizing such an attaching and detaching tool, a problem arises, by which the attaching and detaching management of optical connectors becomes cumbersome. Therefore, in the case where the optical connectors disposed at a high integration density are detachably connected to each other, and optical connectors are detachably connected to an optical module mounted on a substrate at a high integration density, it was difficult to connect the optical connectors to each other and to disconnect the same from each other, using the proposed method for connecting optical connectors.

SUMMARY OF THE INVENTION

The present invention was developed in view of the above problems, and it is therefore a first object of the invention to provide an optical connector housing which enables easy attachment and detachment of optical connectors without any need for any exclusive attachment and detachment tool, and an optical connector using the optical connector housing. In addition, it is a second object of the invention to provide an optical connector using an optical connector housing by which an optical connector can be detachably connected to an optical component such as an optical module at a high integration density, and a connection structure between the optical connector and an optical component.

In order to achieve the above-mentioned objects, the invention is constructed so as to have the following means in order to solve the problems. That is, an optical connector housing according to the invention, which is provided with arm portions extending from both end sides of the face at the base end side, space put between said arm portions is constituted as the accommodation space of a ferrule of said optical connector, comprises an engaging portion formed so as to be engaged with an object to be connected, at the tip end side of said respective arm portions, and an angle widening drive cam face, which can open the clearance between the arm portions when said ferrule is drawn near the face side of said base end side, protruding from and formed at the inner wall of said arm portions, extending from the position of the rear end face of said ferrule to be accommodated in said accommodation space to the base end side of an optical connector housing.

A first aspect of an optical connector according to the invention is featured in that it is provided with an optical connector housing thus constructed above, a ferrule is accommodated in the ferrule accommodation space of said optical connector housing, and a resilient member, which presses said ferrule against an object to be connected, secured so as to extend from the rear end face of said ferrule to the face at the base end side of the optical connector housing.

Further, a second aspect of an optical connector according to the invention is featured in that, in addition to the first aspect of the optical connector according to the invention, the tip end portions of the arm portions of an optical connector housing extend beyond the connection end face of said ferrule.

A third aspect of an optical connector according to the invention is featured in that, in addition to the first or second aspect of the optical connector according to the invention, an optical fiber protection housing is provided so that an optical fiber ribbon led out from the rear end side of a ferrule accommodated in the ferrule accommodation space of an optical connector housing is placed between both the sides thereof, or so that the outer circumferential surface thereof is covered, said optical fiber protection housing is provided in said optical connector housing in a state where it does not come out, and in a state where it can advance and retract in the extending direction of the arm portions of said optical connector housing, and a cam surface contacting portion which, when pulling said optical fiber protection housing rearwards, is brought into contact with the surface of an angle widening drive cam of the arm portions of said optical connector housing and drives so as to open the optical connector housing is formed in said optical fiber protection housing so as to protrude toward said arm portion side.

In addition, a fourth aspect of an optical connector of the invention is featured in that, in addition to the third aspect of the invention, a ferrule stopping portion to be engaged with a flange portion or in a recess portion formed at the ferrule is provided in the optical fiber protection housing.

Still further, a first aspect of a connection structure between an optical connector and an optical component according to the invention is featured in that, by an engaging portion of an optical connector in the first or second construction of the optical connector according to the invention with a portion to be engaged of an optical component being an object to be connected, said optical connector is connected to said optical component being an object to be connected, wherein when a ferrule is drawn near the rear end side of the arm portion against a pressing force of a resilient member, the rear end side of the ferrule moves along the surface of the angle widening drive cam to cause the arm portions to be widened and said engaging portion is disengaged from said portion to be engaged, whereby the connection between the optical connector and said optical component being an object to be connected is released.

Also, a second aspect of a connection structure between an optical connector and an optical component according to the invention is featured in that, by engaging an engaging portion of an optical connector in the third or fourth aspect of the optical connector according to the invention with a portion to be engaged of an optical component to be connected, said connector is connected to the optical component being an object to be connected, wherein when an optical fiber protection housing is drawn toward the rear end side thereof, the cam surface contacting portion of the optical fiber protection housing moves along the surface of an angle widening drive cam to cause the arm portions to be widened, and wherein when said engaging portion is disengaged from said portion to be engaged, the connection between the optical connector and the optical component being an object to be connected is released.

A third aspect of a connection structure between an optical connector and an optical component according to the invention is featured in that, in addition to the first or second aspect of the connection structure between an optical connector and an optical component according to the invention, a plurality of optical fibers are disposed in parallel in a ferrule of the optical connector, and optical components being objects to be connected are arrayed and formed on a substrate in an erect state in the form of an array along the surface of said substrate, wherein by an engaging portion of an optical connector housing being engaged with a portion to be engaged of an optical component being an object to be connected, said optical components being objects to be connected and said optical connector are detachably connected to each other so that a plurality of optical fibers of said respective optical connector are arrayed in a perpendicular direction with respect to the surface of said substrate.

Further, a fourth aspect of a connection structure between an optical connector and an optical component according to the invention is featured in that, in addition to the first or second aspect of the connection structure between an optical connector and an optical component according to the invention, a plurality of optical fibers are disposed in parallel in a ferrule of an optical connector, section guiding walls are arrayed and formed on a substrate in an erect state in the form of an array along the surface of said substrate, optical components being objects to be connected are disposed in an erect state between the respective section guiding walls, and the tip end sides of the respective section guiding walls protrude forwards from the connection end faces of optical components being objects to be connected, so that they become an optical connector insertion guide, wherein said optical connectors are guided by and inserted into said optical connector insertion guide, and by an engaging portion of the optical connector housing being engaged with a portion to be engaged of the optical components being objects to be connected, said respective optical components being objects to be connected are detachably connected to said optical connector.

In the invention thus constructed, arm portions extend from both end sides of the face at the base end side of an optical connector housing, and a ferrule of the optical connector is accommodated in an accommodation space of the optical connector placed between the arm portions. In the optical connector housing, an engaging portion engaged with an object to be connected is formed at the tip end side of the respective arm portions. Therefore, for example, by pressing the optical connector housing to the objects to be connected, and engaging the engaging portion with a portion to be engaged of the object to be connected such as, for example, an optical module, the optical connector can be connected to an optical component being an object to be connected.

Also, in the optical connector housing, the surface of an angle widening drive cam is formed to protrude on the inner wall of the arm portions from the position of the rear end face of a ferrule accommodated in the accommodation space, to the base end side of the optical connector housing. Therefore, when the ferrule is drawn to the face side of the base end side of the optical connector housing, the tip ends of the arm portions of the optical connector housing are widened by actions of the surface of the angle widening drive cam (by the rear end face of the ferrule being drawn to the base end side of the optical connector housing along the surface of the angle widening drive cam). Therefore, the engaging portion of the optical connector housing is disengaged from the portion to be engaged, at the side of objects being connected, whereby the optical connector is disconnected from the objects to be connected.

In addition, in such a construction that an optical fiber protection housing is provided in a ferrule accommodation space of the optical connector housing, when the optical fiber protection housing is pulled rearward, the cam surface contacting portion of the optical fiber protection housing moves along the surface of the angle widening drive cam to cause the tip ends of the arm portions to be widened as the arm portions are widened. Therefore, the engaging portion of the optical connector housing is disengaged from the portion to be engaged at the side of objects to be connected, whereby the optical connector is disconnected from the objects to be connected.

As described above, in the invention, by only engaging the engaging portion at the tip end of the arm portions of the optical connector housing with the portion to be engaged at the side of objects to be connected, it is possible to very easily connect an optical connector to objects to be connected. Besides, when disconnecting them from each other, by only drawing the ferrule of the optical connector to the base end side of the optical connector housing or pulling the optical fiber protection housing rearwards, it is possible to very easily disconnect the optical connector from the objects to be connected. Thus, in the invention, the optical connector can be easily connected to or disconnected from objects to be connected, without the use of any special connection tool.

As described above, according to an optical connector housing, an optical connector, and a connection structure between the optical connector and optical components according to the invention, it is possible to very easily detachably connect optical connectors to objects to be connected, without the use of any special connection tool. Furthermore, the construction of the optical connector housing and optical connectors is very simple. Therefore, it is possible to array optical connectors and objects to be connected such as optical modules, etc., at a high integration density.

In particular, for example, as in the third and fourth constructions of a connection structure between optical connectors and optical modules according to the invention, a plurality of optical modules are arrayed on a substrate in an erect state in the form of an array along said substrate. And, if optical connectors of the respective constructions are detachably connected to the respective optical modules, optical connectors and optical modules can be disposed at a yet higher integration density, whereby a plurality of optical fibers arrayed in an optical connector can be disposed at a higher integration density.

In an optical connector constructed so that an optical fiber protection housing is provided in a ferrule accommodation space of the optical connector housing, when disconnecting the optical connector from an object to be connected, the optical fiber ribbon leading from the rear end side of the ferrule of the optical connector is not pulled, but as shown above, the optical fiber protection housing is pulled rearward, whereby the tip ends of the arm portions of the optical connector housing are widened, and the optical connector is disconnected from the object to be connected. Thus, since the connection of the optical connector is released not by pulling the optical fiber ribbon but pulling the optical fiber protection housing, a fear that the optical fibers may be damaged can be completely prevented when disconnecting the optical connector.

Still further, in an optical fiber protection housing in which a ferrule holding portion engaged in a flange portion or a recess formed in the ferrule, by engaging the ferrule holding portion of an optical fiber protection housing with the flange portion of the ferrule or in a recess portion thereof, the optical fiber protection housing and ferrule are made integral with each other. Therefore, when pulling the optical fiber protection housing rearward, the ferrule can pulled rearward at the same time. Accordingly, when releasing the engaged optical connector, the connection between the ferrule and objects to be connected can be carried out at the same time.

Further, according to the fourth construction of a connection structure between an optical connector and optical components according to the invention, section guiding walls are arrayed and formed on a substrate in an erect state in the form of an array along the surface of the substrate, and optical components being objects to be connected are arrayed in an erect state between respective section guiding walls. Since the tip end side of the respective section guiding walls can be used as an optical connector insertion guide, connection between the optical connector and optical components being objects to be connected can be further easily carried out.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIGS. 4(a)–4(c) are explanatory views showing an example in which the connection structure between an optical connection having an optical connector housing according to the second preferred embodiment used therein and an optical component is applied to a connection between an optical module secured between section guiding walls and an optical connector;

FIG. 5 is an explanatory view showing an example in which a connection structure between an optical connector using an optical connector housing according to the second preferred embodiment and optical components is applied to a connection between a plurality of optical modules incorporated on a substrate and an optical connector;

DESCRIPTION OF THE PREFERRED EMBODIMENTS

Figure 1A:
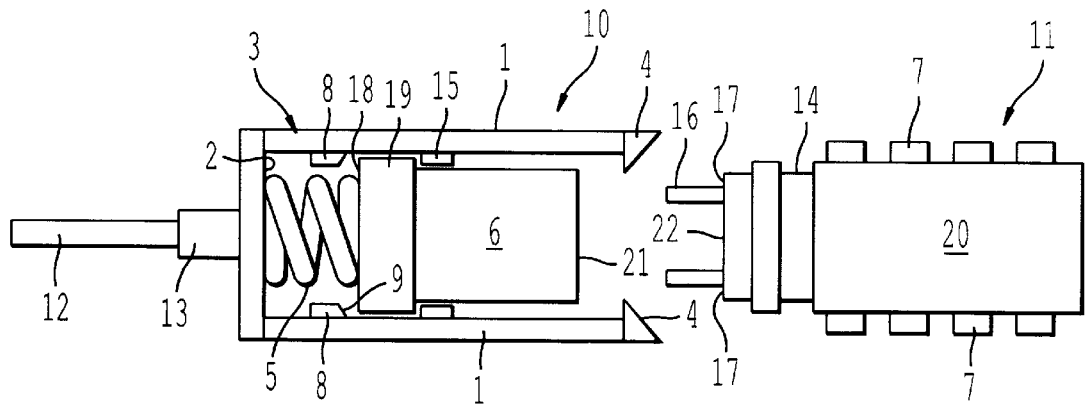
FIGS. 1(a)–1(c) are explanatory views showing a first preferred embodiment of a connection structure between an optical connector and optical components, in which an optical connector housing according to the invention is employed.

The preferred embodiments will now be described with reference to the accompanying drawings, wherein like reference numerals designate corresponding or identical elements throughout the various drawings.

In order to describe the invention in further detail, a description is given of modes of embodiments of the invention with reference to the accompanying drawings. Besides, in the following description of respective embodiments described below, parts which are identical to those in the prior art examples are given the same reference numbers, and overlapping description of the common components is omitted.

In FIG. 1(a), an example of a connection structure between an optical connector and optical components, which is the first preferred embodiment of the connection structure between the optical connector using an optical connector housing according to the invention and optical components, is illustrated in the form of a plan view. As shown in FIG. 1(a), in the first preferred embodiment, an optical connector housing 3 is provided with arm portions 1 each extending from both end sides of the face 2 at the base end side and is formed channel-like. Space placed between the above respective arm portions 1 constitutes an accommodation space in a ferrule 6 of an optical connector 6. Claws 4 acting as engaging portions which are engaged with objects to be connected (in the first preferred embodiment, optical module 11) are formed at the tip end side of the respective arm portions 1. Also, The ferrule 6, optical fiber ribbon 12 and boot 13 are formed as in the prior art examples.

A characteristic point of the optical connector housing according to the first preferred embodiment resides in that the surface 9 of an angle widening drive cam protrudes from and is formed on the inner walls of the arm portions 1 extending from the position of the rear end face 18 of the ferrule accommodated in the above-mentioned accommodation space to the base end side of the optical connector housing 3. In the first preferred embodiment, a protrusion portion 8 is formed on both the inner walls of the arm portions 1, and the surface 9 of the angle-widening drive cam is in the form of a tapered surface at the side opposed to the rear end face 18 of the ferrule, which is formed at the protrusion portions 8. The surface 9 of the angle widening drive cam is to widen the arm portions 1 when the ferrule 6 is drawn to the side of the face 2 at the base end side.

As shown in FIG. 1(a), in the optical connector 10, a spring 5 is provided so as to extend from the rear end face 18 of the ferrule 6 to the face 2 at the base end side of the optical connector housing 3. The spring 5 functions as a resilient body which presses the ferrule 6 to the objects to be connected. Also, the tip end of the arm portions 1 of the optical connector housing 3 extends forward of the connection end face of the ferrule 6. In addition, a stopper 15 protrudes from the inner wall of the arm portions 1 at the central portion thereof. The stopper 15 stops a flange portion 19 in engagement with each other, whereby the ferrule 6 is prevented from coming off from the optical connector housing 3.

Figure 11A:
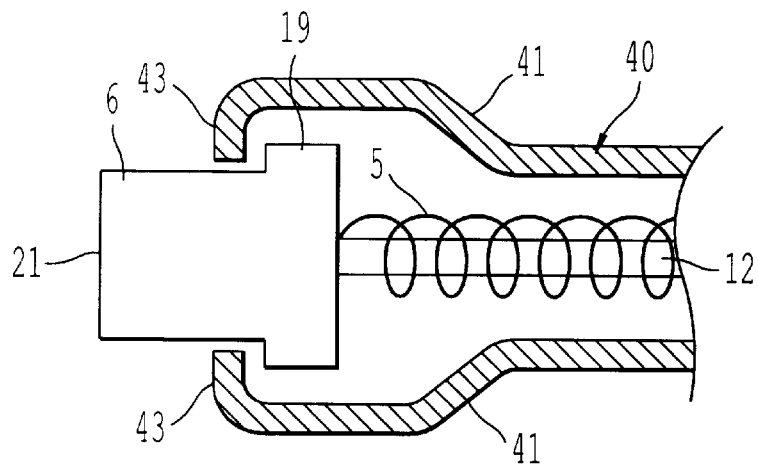
FIGS. 11(a)–11(c) are explanatory views showing another example of an optical fiber protection housing construction which is applied to an optical connector using an optical connector housing according to the invention.
Figure 11B:
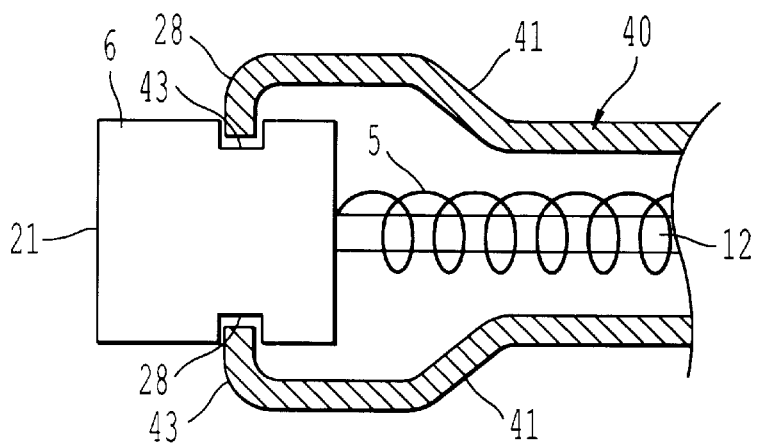

Further, an optical module 11 connected to the optical connector 10 has an MT ferrule type package 20. The package 20 has a plurality of lead terminals 7 provided at both sides thereof, in order to mount, for example, the module 11 on a substrate. Also, the optical module 11 is provided with a recess 14 as a portion to be engaged, with which the claw portions at the tip end of the optical connector housing 3 are engaged. Also, a pair of guide pin holes 17 are formed on the connection end face 22 of the optical module 11, and as shown in FIG. 11(a), guide pins 16 for connection with the optical connector 10 are, respectively, inserted into the guide pin holes 17.

Figure 1B:
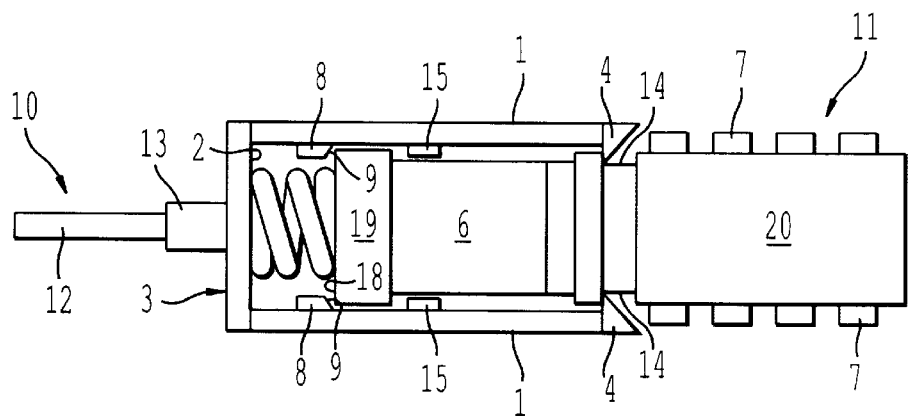

In the connection structure according to the first preferred embodiment, when connecting the optical connector 10 with the optical module 11, for example, they press the optical connector 10 into the optical module 11 side holding the optical connector housing 3, and as shown in FIG. 1(b), the claw portions 4 of the optical connector 10 are engaged with the recess 14 of the optical module 11, whereby connection between the optical connector 10 and the optical module 11 is carried out.

Figure 1C:
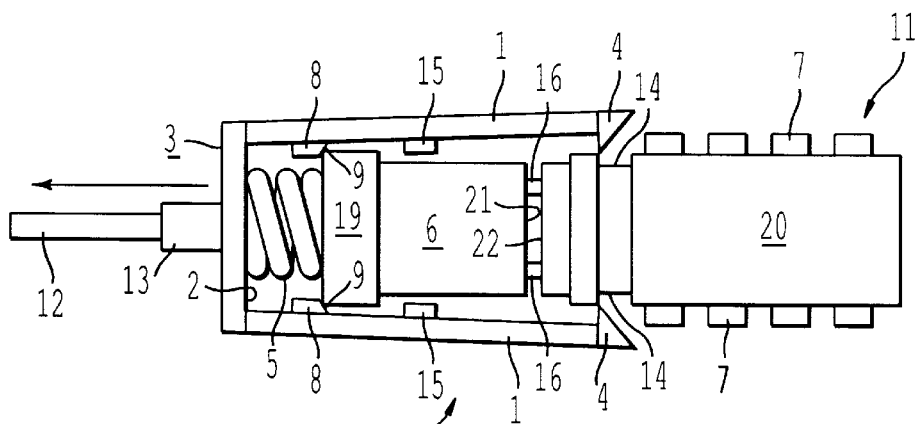

Besides, when disconnecting such a state, for example, the ferrule 6 is pulled to the rear end side of the arm portions 1 against the force of the spring 5, whereby as shown in FIG. 1(c), the rear end portion of the ferrule 6 moves along the surface 9 of the angle widening drive cam to widen the arm portions 1, wherein the claw portion 4 is disconnected from the recess 14, and the connection between the optical connector 10 and the optical module 11 is broken.

Also, work of drawing the ferrule 6 of the optical connector 6 to the rear end side of the arm portions 1 may be carried out by holding the ferrule 6 directly, by pulling the optical fiber tape ribbon 12, or by pulling the boot 13. In the first preferred embodiment, as described above, such a construction is employed, in which the optical connector housing 3 is formed channel-like and it can directly touch both the upper and lower sides of the ferrule 6. Therefore, when disconnecting the optical connector 10, by drawing the corresponding ferrule 6 with the ferrule held directly, it is possible to very easily carry out disconnection of the optical connector.

According to the first preferred embodiment, as described above, the claw portion 4 is provided at the tip end side of the arm portions 1 of the optical connector housing 3 of the optical connector 10, and the recess 14, which is engaged with the claw portion 4 is provided at the optical module being an object to be connected. Therefore, by only engaging the claw portion 4 of the optical connector 10 in the recess 14 of the optical module 11, the optical connector 10 can be connected to the optical module 11.

Also, since the surface 9 of the angle widening drive cam is provided on the inner wall surface of the optical connector housing 3 of the optical connector 10, the optical connector 10 can be disconnected from the optical module by only drawing the ferrule 6 of the optical connector 10 to the base end side of the optical connector housing 3.

As described above, in the first preferred embodiment, no very cumbersome work, in which a special connection tool is used, is required, and it is possible to very easily connect the optical connector 10 to the optical module 11 and to disconnect the former from the latter.

Thus, since the optical connector 10 and optical module 11 can be detachably connected very easily, it is possible to array and dispose the optical connector 10 and optical module 11 at a high integration density. Based thereon, a still higher integration density mounting can be provided. Furthermore, in the first preferred embodiment, the construction of the optical connector housing 3 and optical connector 10 is very simple. Therefore, components connecting between the optical connector 10 and optical module 11 can be disposed at a high integration density surely, and since it is possible to very easily produce the optical connector 10 and optical connection housing 3, production cost thereof can be further reduced.

Figure 2:
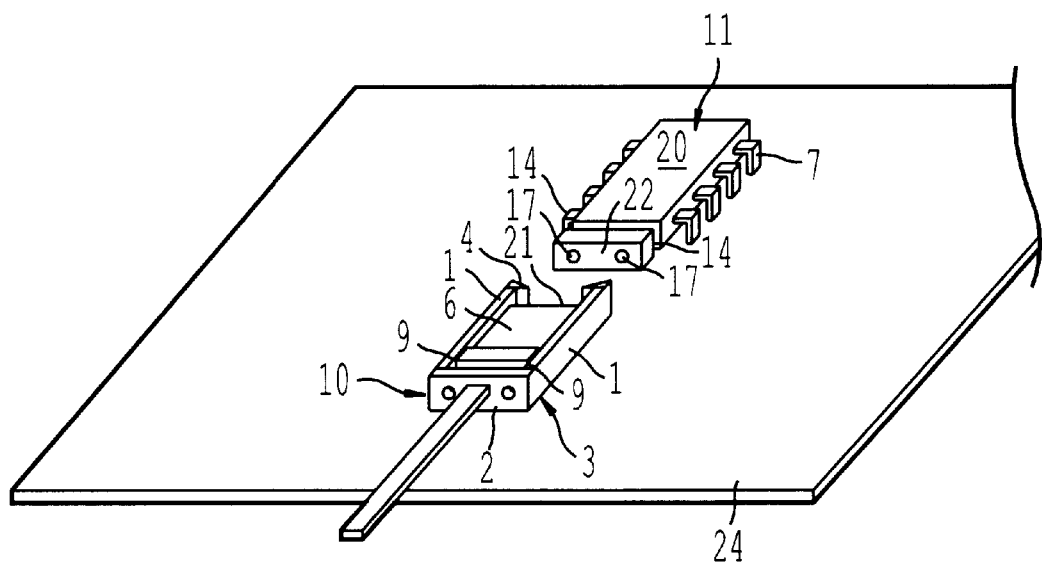
FIG. 2 is a perspective view showing an example in which a connection structure according to the first preferred embodiment is applied to a connection between an optical module mounted on an electronic circuit substrate and an optical connector.

In FIG. 2, one example of a connection structure between an optical module 11 and an optical connector 10, to which the first embodiment is applied, is illustrated in the form of a perspective view. The optical module 11 shown in FIG. 2 is mounted on an electronic circuit substrate 24. By applying the first embodiment to a connection structure between such an optical module and an optical connector 10, without a connection tool the optical connector 10 can be very easily, securely and detachably connected to the optical module mounted on the electronic substrate 24.

Figure 3:
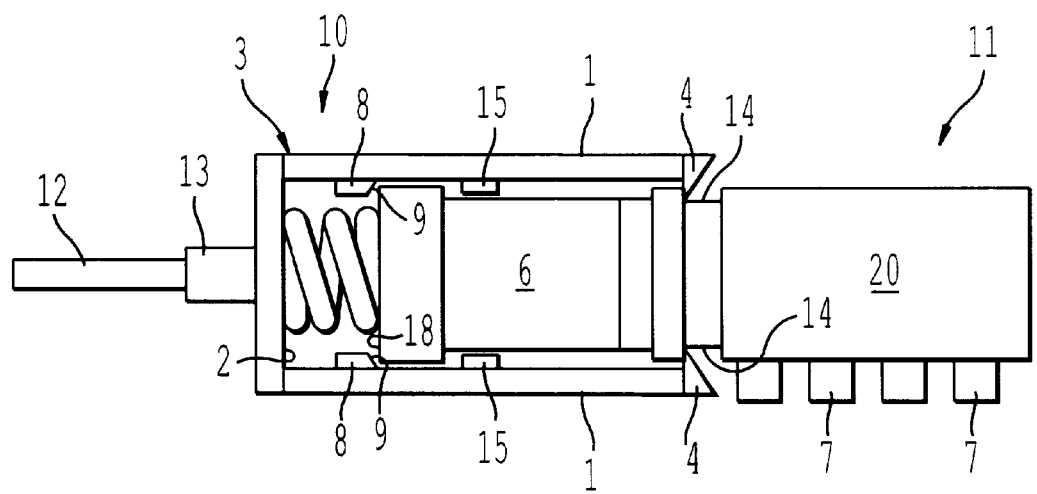
FIG. 3 is an explanatory view showing a second preferred embodiment of a connection structure between an optical connector and optical components, in which an optical connector housing according to the invention is employed.

FIG. 3 shows an example of the structure, further showing a connected state where the second preferred embodiment of a connection structure between an optical connector using an optical connector housing according to the invention and an optical component connects an optical connector to an optical module. Also, in the description of the second preferred embodiment, parts which are identical to those in the first preferred embodiment are given the same reference numbers, and overlapping description of the common components is omitted.

A characteristic point at which the connection structure between the optical connector 10 and optical module 11 according to the second embodiment differs from that in the first preferred embodiment resides in that the optical module 11 is constructed so as to have lead terminals 7 at only one side of the package 20, and the optical connector 10 is connected to such an optical module. All the others remain the same as those in the first preferred embodiment.

In the second preferred embodiment, for example, utilizing the lead terminals 7 of the optical module 11, the optical module 11 is mounted on a substrate in an erect state, whereby the optical module 11 and optical connector 10 can be mounted at still higher integration density. The method for connecting the optical connector 10 to the optical module 11 and disconnecting the former from the latter is similar to that in the first preferred embodiment, wherein the same effects can be brought about.

Also, an optical module 11 shown in FIG. 4(a) may be guided by section guiding walls 30 shown in FIG. 4(b), and disposed and mounted on a substrate 24. In this case, for example, the tip end side 32 of the section guiding wall 30 protrudes forward from the connection end face 22 of the optical module 11, and the protruding part thereof may function as an optical connector insertion guide. In such a case, when connecting the optical connector 10 to the optical module 11, for example, as shown in FIG. 4(c), the connection end faces of the optical connector 10 and optical module 11 are opposed to each other. And, the optical connector 10 is inserted between the section guiding walls 30 along the optical connector insertion guide of the section guiding walls 30, wherein the claw portion 4 of the optical connector housing 3 of the optical connector 10 is engaged with the recess 14 of the optical module 11. Thereby, the optical connector 10 is connected to the optical module 11. Since an optical connector-insertion guide is provided at the section guiding walls 30, it is possible to further easily and securely connect the optical connector 10 and the optical module 11 to each other.

In addition, in the second preferred embodiment, for example, utilizing an assembled body of such section guiding walls 30 as shown in FIG. 5, it is possible to dispose a connected body consisting of the optical module 11 and optical connector 10 at a high integration density. That is, a plurality of section guiding walls 30 are arrayed and disposed on a substrate 24 in an erect state in the form of an array along the substrate surface, and the section guiding walls 30 are supported by a guide supporting portion 31. Optical modules 11 are, respectively, disposed between these section guiding walls 30 in an erect state, and optical connectors 10 are, respectively, connected to the respective optical modules 11, whereby a connected body consisting of the optical modules 11 and optical connectors 10 can be disposed at a higher integration density.

In an example shown in FIG. 5, the tip end sides 2 of the section guiding walls 30 may protrude forward from the connection end face 22 of the respective optical modules 11 and constitute an optical connector insertion guide as in the example shown in FIG. 4. Thus, in the case where the optical connector insertion guide is formed on the section guiding walls 30, it is possible to very easily connect the respective optical modules 11 and optical connector 10 to each other as in the above description. As a matter of course, as in the example shown in FIG. 5, in the case where optical connectors 10 are, respectively, connected to a plurality of optical modules 11, the optical modules 11 and optical connectors 10 can be detachably connected to each other without the use of any connection tool, and it is very convenient.

In the examples shown in FIG. 4 and FIG. 5, since optical modules can be arrayed in the vertical direction with respect to the reference surface of the substrate 24, it is possible to mount optical fibers at a very high integration density.

Figure 6:
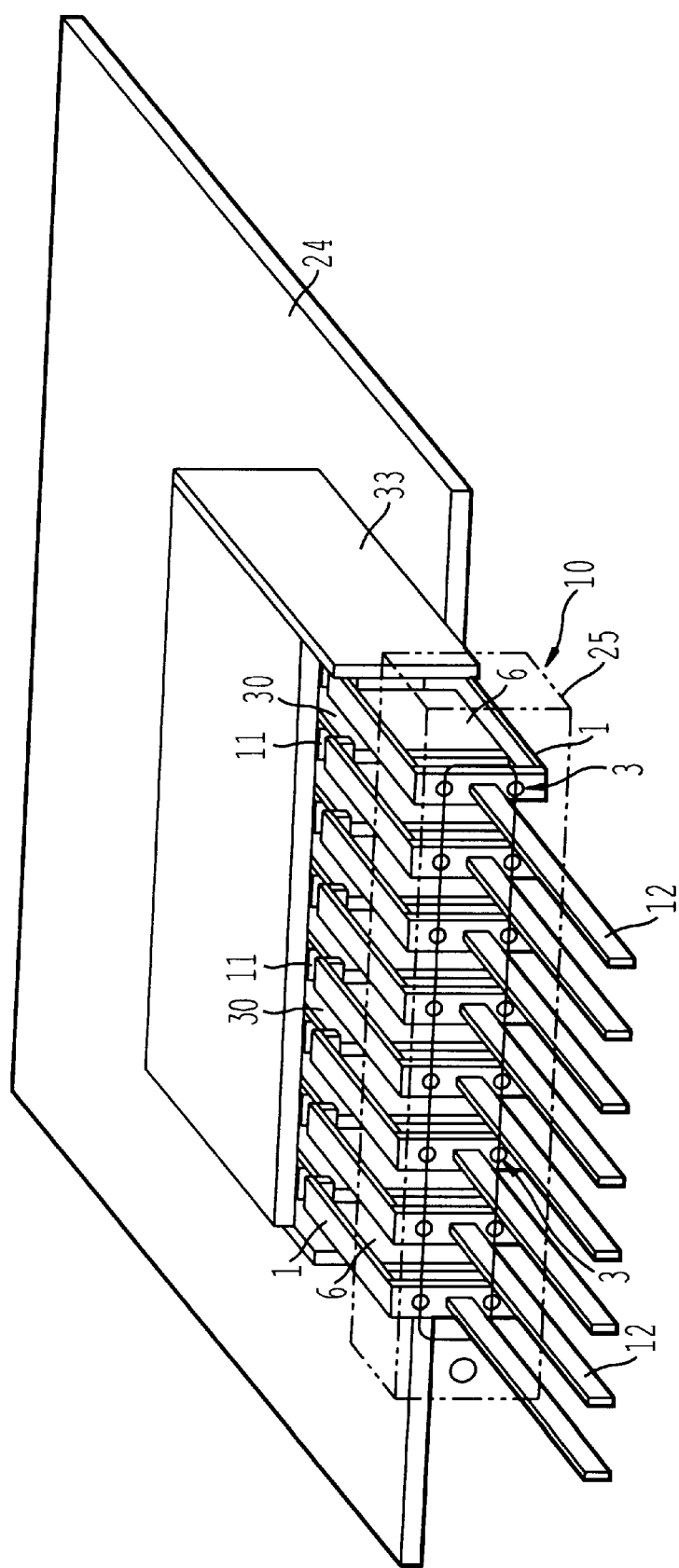
FIG. 6 is another explanatory view showing an example in which a connection structure between an optical connector using an optical connector housing according to the second preferred embodiment and optical components is applied to a connection between a plurality of optical modules incorporated on a substrate and an optical connector.

FIG. 6 shows an example, to which a connection structure between an optical connector and optical modules according to the second preferred embodiment is applied, in the form of a perspective view. In the example shown in FIG. 6, an optical module 10 is connected to the optical modules 11 mounted on an electronic circuit substrate 24, wherein the optical module 11 and optical connector 10 are provided with a unique construction shown in the second preferred embodiment. Also, the section guiding walls 30 shown in FIG. 5 are accommodated in a guide package 33. In the example shown in FIG. 6, the optical modules 11 and optical connector 10 can be detachably connected to each other.

In addition, in the example shown in FIG. 6, in order to prevent the optical connector 10 from coming off from the optical modules 11 as a result of the optical fiber ribbon 12 being carelessly caught by something, the optical connector 10 is fixed by providing the cover 25. When disconnecting the optical connector 10 from the optical modules 11, the disconnection can be carried out by removing the cover 25 and drawing a desired optical connector 10 to the base end side of the optical connector housing 3.

Figure 7A:
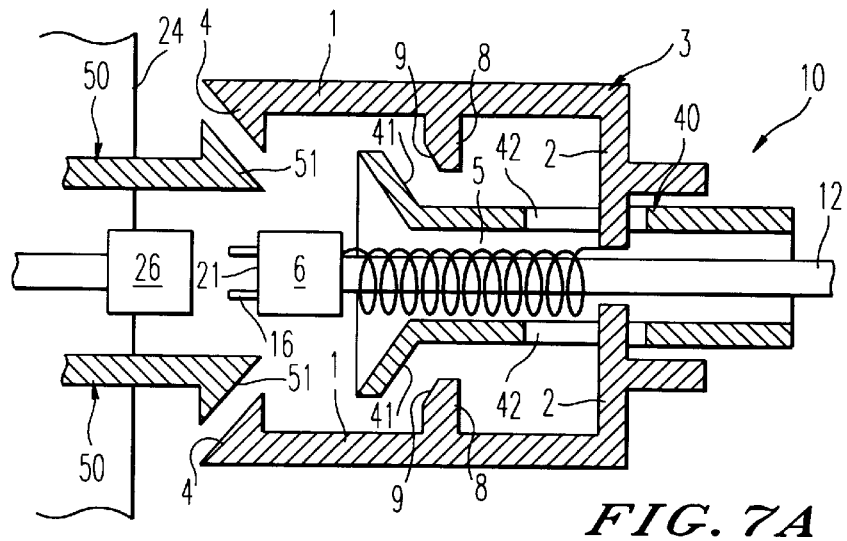
FIGS. 7(a)–7(c) are explanatory views showing a third preferred embodiment of a connection structure between an optical connector using an optical connector housing according to the invention and optical components.
Figure 7B:
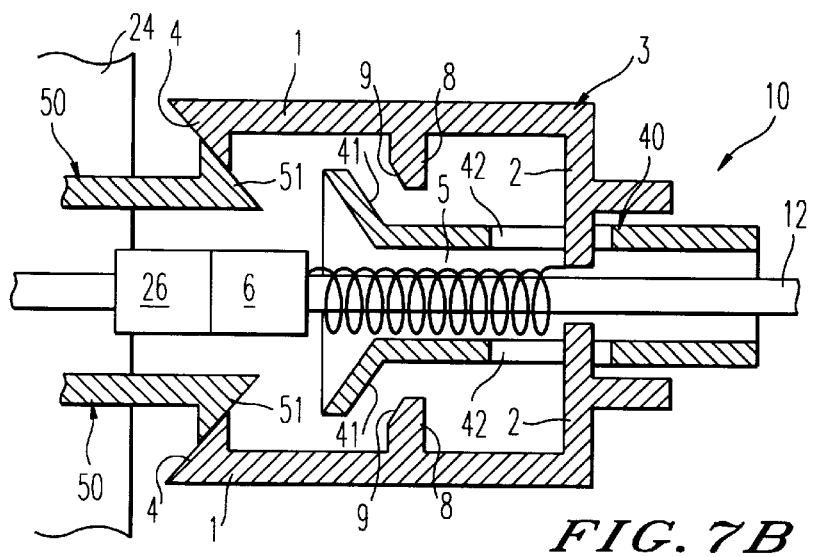
Figure 7C:
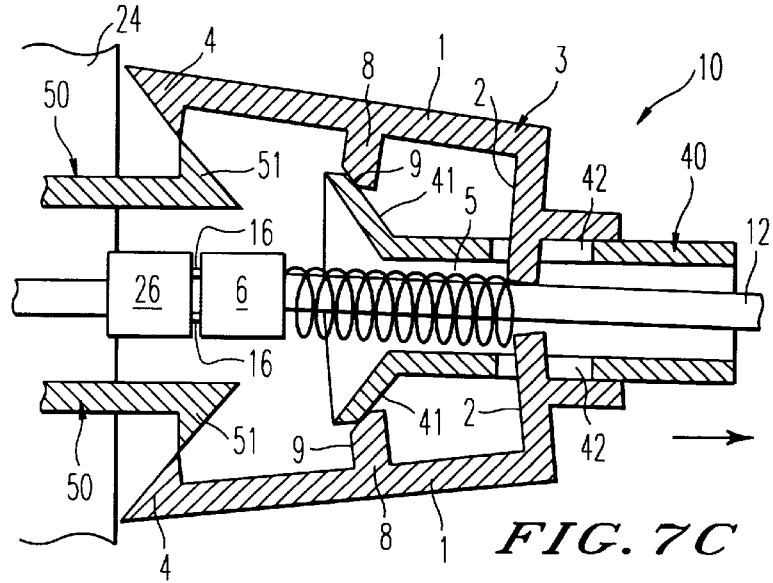
Figure 8:
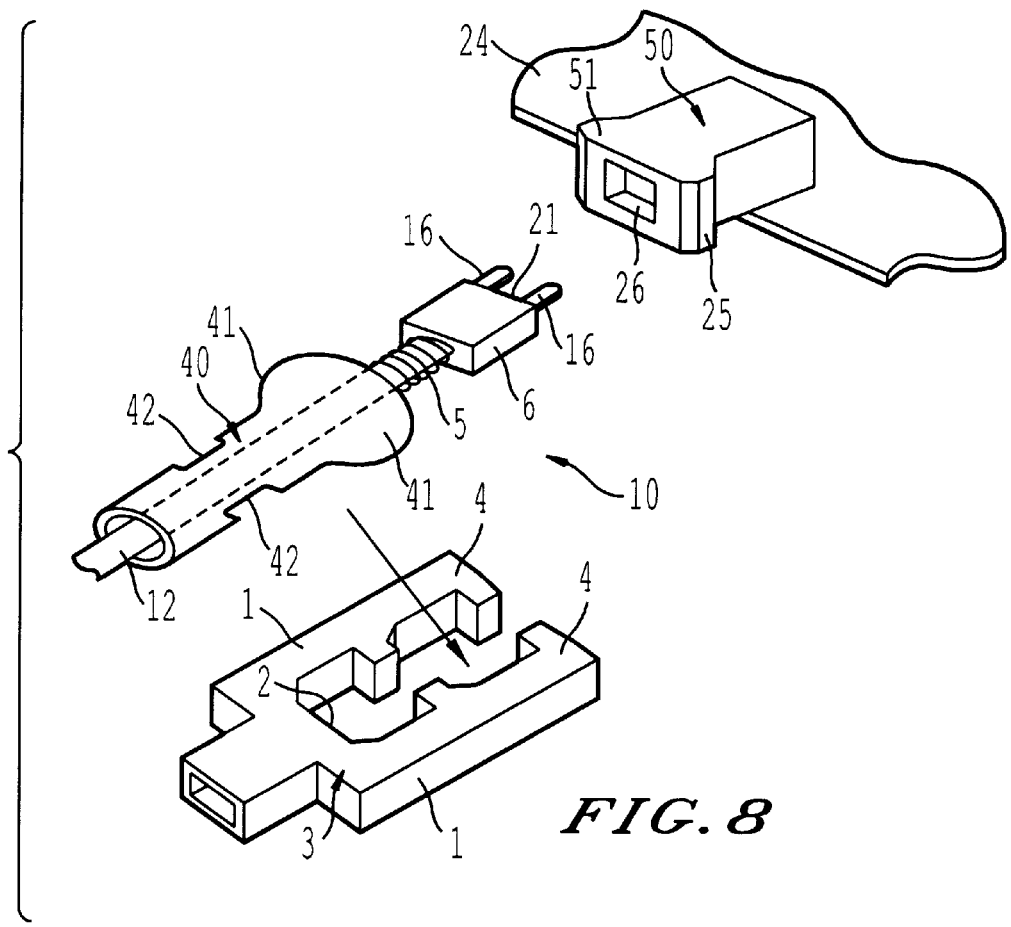
FIG. 8 is an explanatory view, shown by a perspective view, showing, in a disassembled state, an optical connector applied to the above third preferred embodiment along with an optical connector at the objects to be connected.

In FIG. 7, a connection structure between an optical connector and a connector being an object to be connected, which is a third preferred embodiment of a connection structure between an optical connector using an optical connector housing and optical components according the present invention, is illustrated in the form of a cross-sectional view. Further, FIG. 8 is a disassembled view showing an optical connector shown in the third preferred embodiment along with an optical connector being an object to be connected, in the form of a perspective view. Also, in the description of the third preferred embodiment, parts which are identical to those in the respective preferred embodiments are given the same reference numbers, and overlapping description of the common parts is omitted.

A characteristic point of the optical connector to which the third preferred embodiment is applied resides in its being constructed so as to prevent an optical fiber ribbon from being damaged when disconnecting the optical connector. That is, as shown in FIG. 7 and FIG. 8, an optical fiber ribbon (in the preferred embodiment fiber tape ribbon 12) is drawn out from the rear end side of the ferrule 6 accommodated in the ferrule accommodation space of the optical connector housing 3. A cylindrical optical fiber protection housing 40 is provided in the form that covers the outer circumferential surface of the optical fiber tape ribbon 12. By means of the optical fiber protection housing 40, it becomes possible to disconnect the optical connector 10 without pulling the ferrule 6 and optical fiber tape ribbon 12. In addition, the ferrule 6 is an MT type in the third preferred embodiment. In FIG. 7 and FIG. 8, illustration of the flange portion 19 shown in FIG. 1 is omitted.

The optical fiber protection housing 40 is provided with two hole portions 42, and the base end portion of the optical connector housing 3 is inserted into the two hole portions 42 at a suitable interval. Thus, in the third preferred embodiment, the optical fiber protection housing 40 is provided so as to advance and retract in the extending direction of the arm portions 1 of the optical connector housing so that it does not come off from the optical connector housing 3.

Also, the cam surface-contacting portion 41 protrudes from and is formed at the arm portion 1 sides in the optical fiber protection housing 40. The cam surface contacting portion 41 is brought into contact with the surface 9 of the angle widening drive cam of the arm portions 1 of the optical connector housing 3 when the optical fiber protection housing 40 is pulled rearwards, and causes the tip end side of the optical connector housing 3 to be widened. In the third preferred embodiment, the cam surface contacting portion 41 is constructed so as to have a tapered surface which is widened toward the tip end side.

In addition, the interval between the hole portion 42 of the optical fiber protection housing 40 and the base end side of the optical connector housing 3 is formed to be an interval, in which, when the optical fiber protection housing 40 is pulled rearwards, the cam surface contacting portion 41 is brought into contact with the surface 9 of the angle widening drive cam of the arm portions 1 of the optical connector housing 3 and the optical connector hosing 3 can be widened.

Also, in the third preferred embodiment, a connector being an object to be connected is accommodated in a connector casing 50 fixed at the substrate 24. A claw 51 to be engaged with, which acts as a portion to be engaged, is provided at the tip end of the connector casing 50.

In the connection structure according to the third preferred embodiment, when the optical connector 10 is connected to the connector being an object to be connected, the optical connector 10 is pressed into the ferrule 26 side, for example, holding the optical connector housing 3, in a state as shown in FIG. 7(*a*) as in the connection structure according to the above mentioned first preferred embodiment, whereby as shown in FIG. 7(*b*), the claw portion 4 is engaged in the claw 5 to be engaged with of the connector casing 50. If so, the ferrule 6 of the optical connector 10 is connected to the ferrule 26 of the connector being an object to be connected.

When disconnecting such a connection structure, as shown in FIG. 7(*c*), the optical protection housing 40 is pulled rearward, whereby the cam surface contacting portion 41 of the optical fiber protection housing 40 moves along the surface 9 of the angle widening drive cam to widen the arm portions 1, whereby the claw portion 4 is disconnected from the claw 51 to be engaged. Therefore, the connection between the optical connector 10 and the connector being an object to be connected is released.

Figure 9:
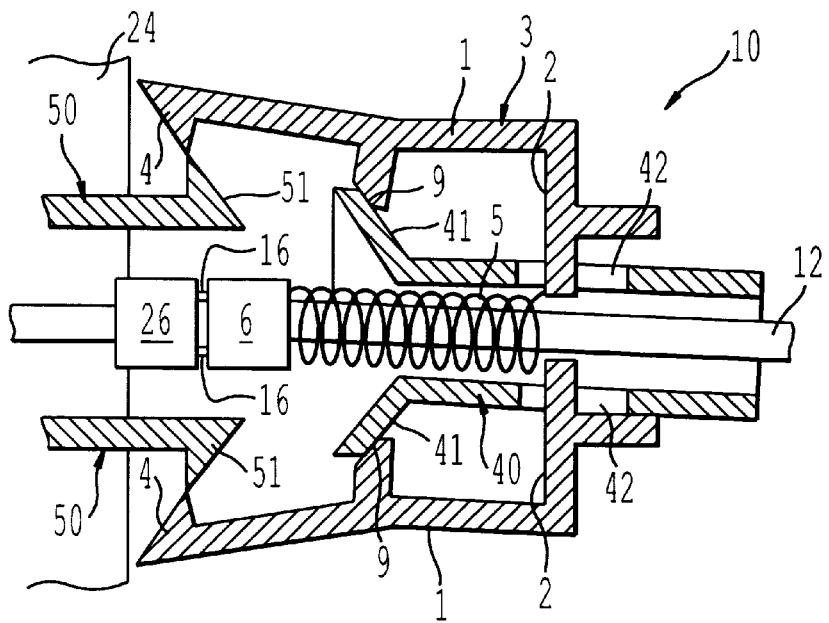
FIG. 9 is an explanatory view showing another example of a deformed state of the optical connector housing when the optical connector is disconnected, in the third preferred embodiment.

Further, in some material of the optical connector housing 3, the arm portions 1 of the optical connector housing 3 are deformed as shown in FIG. 9 to widen the tip end sides thereof. Also, widening resulting from deformation of the arm portions may be available in the first and second preferred embodiments as well.

Since the third preferred embodiment was constructed as described above, the third preferred embodiment can bring about the same effects as those in the respective preferred embodiments.

Also, according to the third preferred embodiment, by providing it with an optical fiber protection housing 40 and pulling the optical fiber protection housing 40 rearward, the optical connector 10 can be disconnected from the side being connected. Since the third preferred embodiment is constructed as described above, no optical fiber tape ribbon 12 may be directly pulled. For example, if the optical fiber tape ribbon 12 is directly pulled when disconnecting the optical connector 10, there is absolutely no possibility that the optical fiber tape ribbon 12 is damaged.

Figure 10A:
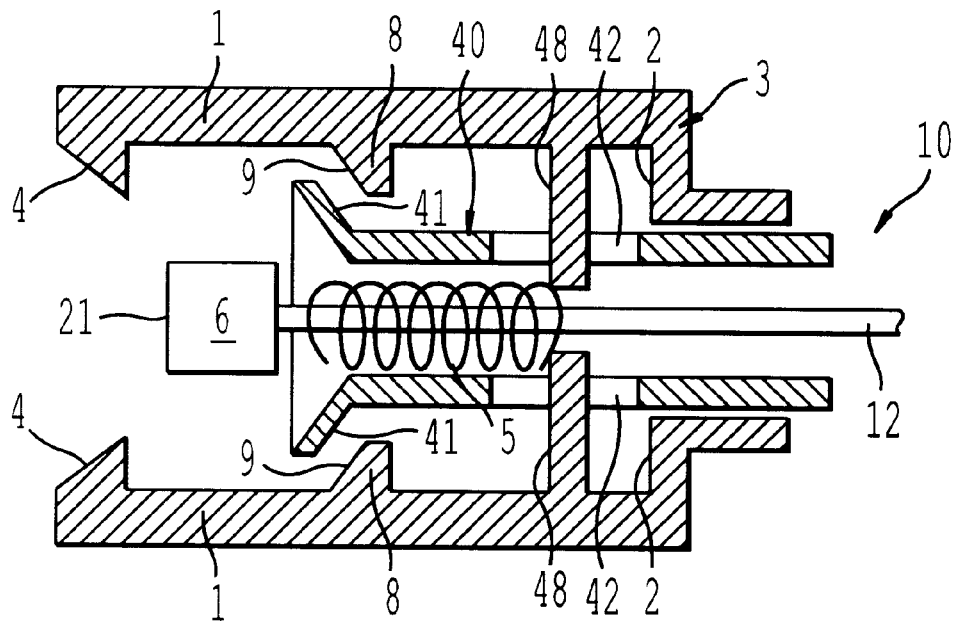
FIGS. 10(a) and 10(b) are explanatory views showing another example of the optical connector using an optical connector housing according to the invention.

Further, the invention is not limited to the above mentioned embodiments, but may be subjected to various modifications. For example, as in the third preferred embodiment, in the case where the optical connector 10 is provided with an optical fiber protection housing 40, a protrusion portion 48 for preventing the housing 40 from coming off is provided on the inner wall of the arm portions of the optical connector housing 3 as shown in FIG. 10(a), and the protrusion portion 48 may be inserted into the hole portion 42 of the optical fiber protection housing 40 with a suitable allowance.

In this case, the interval between the hole portion 42 of the optical fiber protection housing 40 and the protrusion portion 48 for preventing the housing 40 from coming off is formed to be an interval in which, when the optical fiber protection housing 40 is pulled rearward, the cam surface contacting portion 41 is brought into contact with the surface 9 of the angle widening drive cam of the arm portions 1 of the optical connector housing 3, and the optical connector housing 3 can be widened.

In addition, thus, in the case where the protrusion portion 48 for preventing the housing 40 from coming off is provided, it is highly recommended that a spring 5 intervenes between the rear end face of the ferrule 6 and the protrusion portion 48.

Figure 10B:
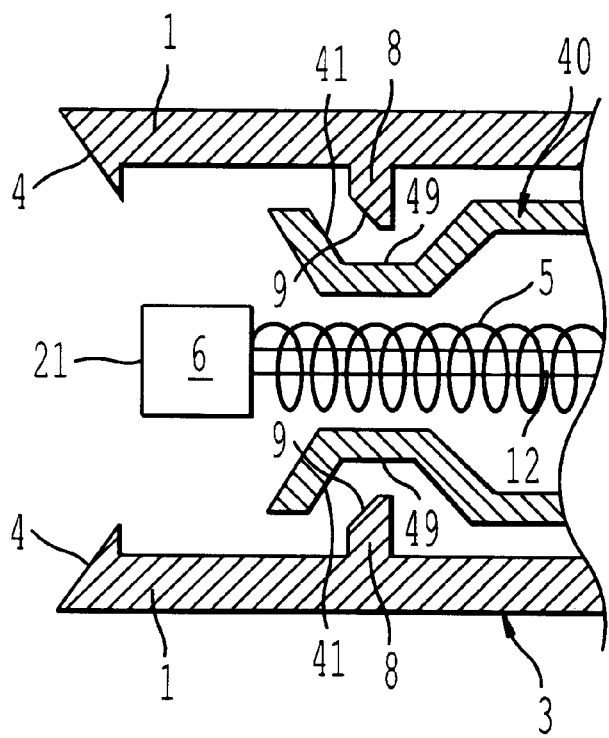

Also, as in the third preferred embodiment, in the case where the optical connector 10 is provided with an optical fiber protection housing 40, the optical fiber protection housing 40 may be constructed in the form as shown in FIG. 10(b). That is, in the example of an optical fiber protection housing 40 shown in FIG. 10(b), a constriction portion 49 is provided at the opposed portions of the optical fiber protection housing 40 with respect to the surface 9 of the angle widening drive cam of the optical connector housing 3.

Figure 11C:
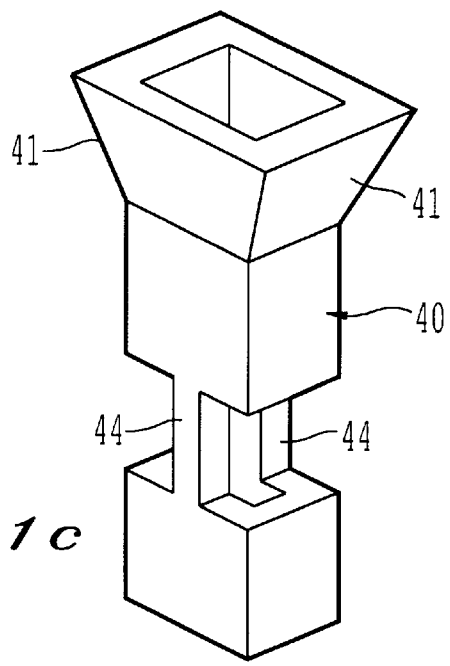

Further, as in the third preferred embodiment, in the case where an optical fiber protection housing 40 is provided in the optical connector 10, the optical fiber protection housing 40 may be constructed in the respective forms shown in FIG. 11(a) and (b). That is, in the example of the optical fiber protection housing 40 shown in FIG. 11(a) and (b), a ferrule holding portion 43 is provided, which is engaged with a flange portion 19 or engaged in a recess 28, either of which is formed on the ferrule 6. If constructed so, when the optical fiber protection housing 40 is pulled rearward, the ferrule 6 can be pulled rearward along with the optical fiber protection housing 40. In addition, a recess 44 may be provided, as shown in FIG. 11(c), instead of the hole portions 42 of the optical fiber protection housing 40 applied to the third preferred embodiment.

Further, although the optical fiber protection housing 40 which is applied to the third preferred embodiment is provided in the form such that the outer circumferential side of the optical fiber tape ribbon 12 drawn out from the rear end side of the ferrule 6 can be covered with, it may be provided in the form such that the optical fiber tape ribbon 12 is sandwiched from both its sides.

Still further, as in the second preferred embodiment, when the optical module 11 is disposed on a substrate in an erect state, the section guiding walls 30 are not necessarily provided. For example, optical modules 11 may be disposed and arrayed on the surface of a substrate 24 in an erect state in the form of an array along the substrate surface without providing any section guiding wall 30. In this case, by the claw 4 of the optical connector housing 3 being engaged in the recess 14 of the respective optical modules 11, a plurality of optical fibers of the respective optical connector 10 will be arrayed in the vertical direction with respect to the substrate surface.

However, as shown in the second preferred embodiment, by providing the section guiding walls 30 and using the tip end side 32 of the section guiding walls 30 as a connector insertion guide, the connection of the optical connector 10 to optical modules 11 can be further easily carried out.

Still further, where a connection structure between an optical connector and optical components according to the invention is applied to a plurality of connections between the optical connector and the optical connector, the optical components disposed on a substrate in an erect state are not necessarily connected to the optical connector 10. For example, as shown in FIG. 13, they may be connected in the form such that optical fibers arrayed in the ferrule 6 of the optical connector 10 or ferrule of the connector being an object to be connected are placed in parallel along the substrate 24.

Figure 13:
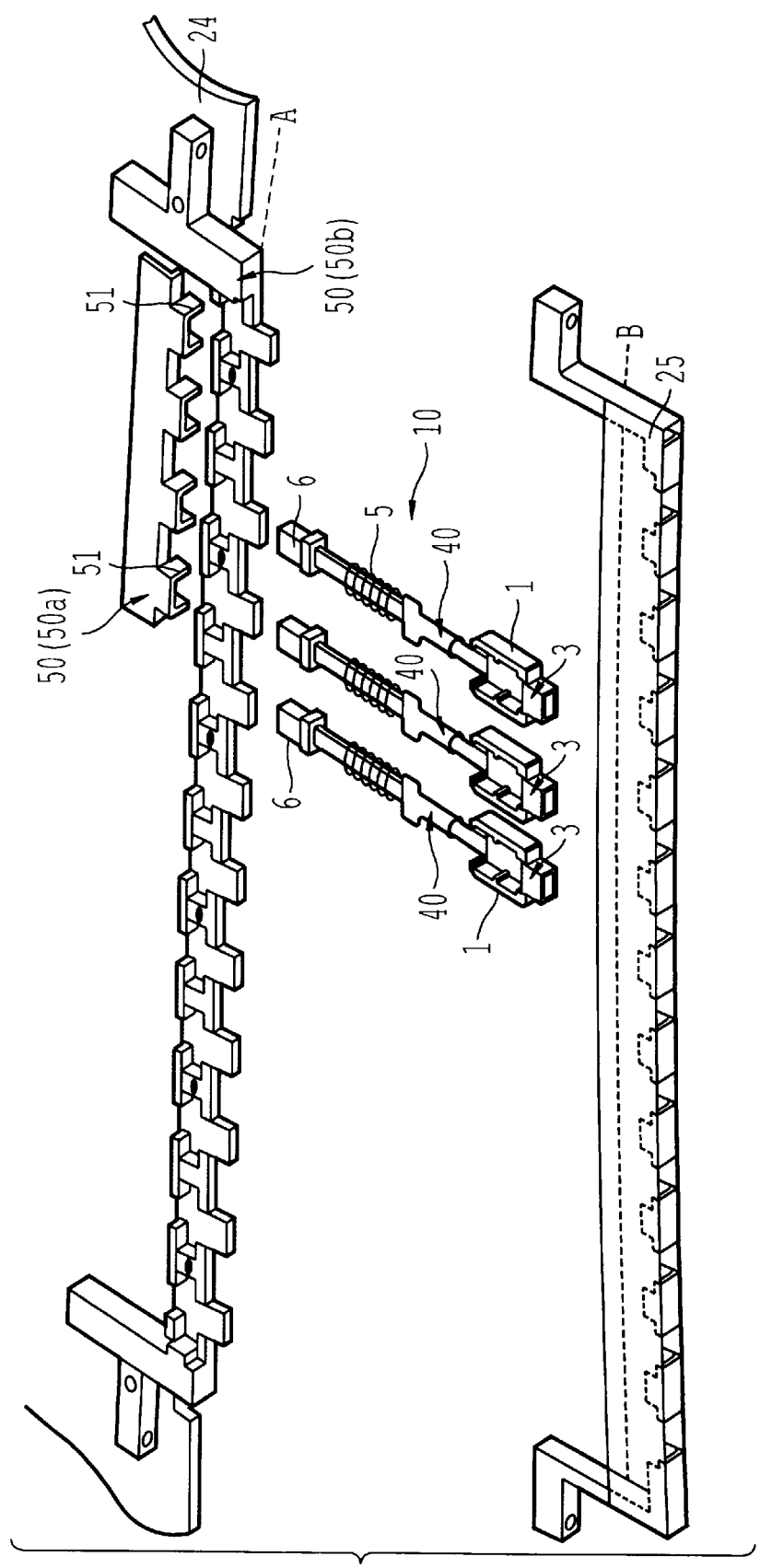
FIG. 13 is an explanatory view showing another example of the connection structure between the optical connector using an optical connector housing according to the invention and optical components.
Figure 14:
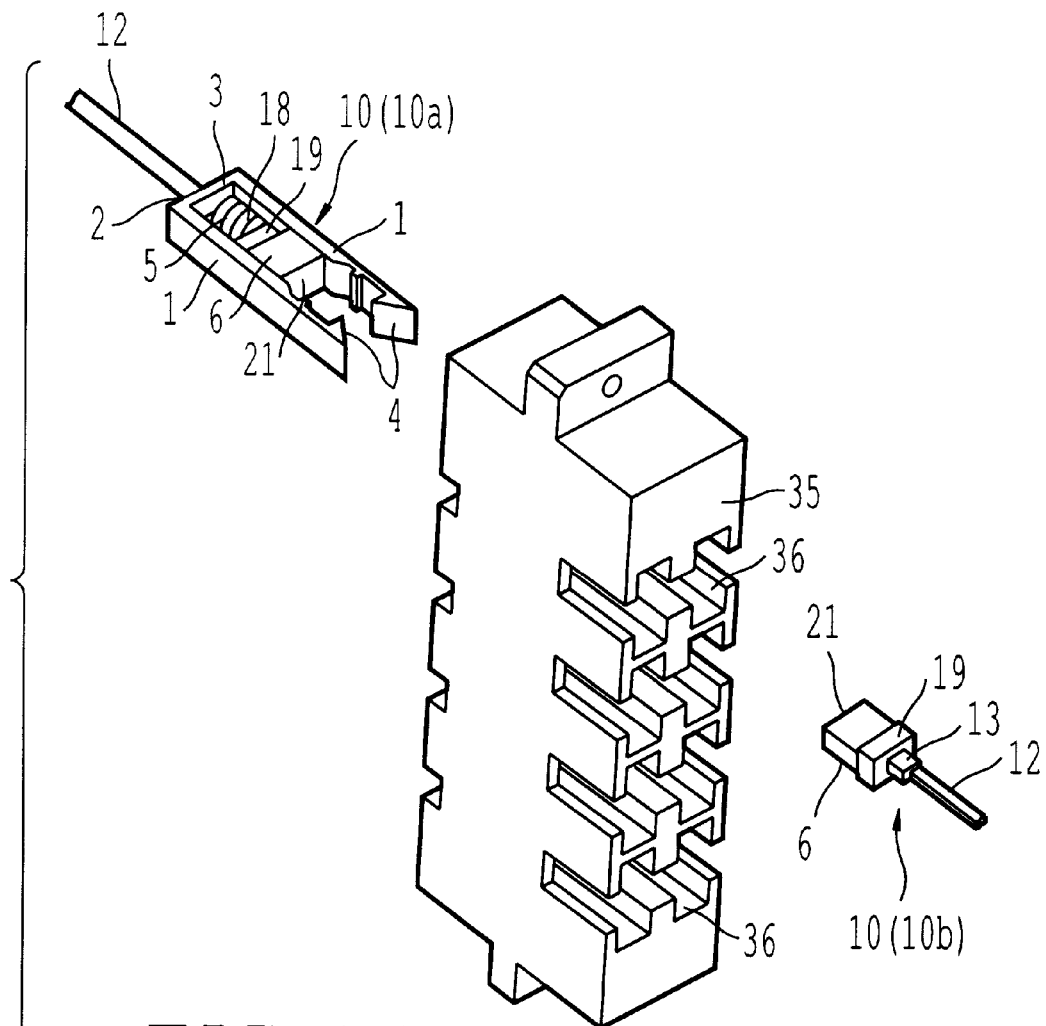
FIG. 14 is an explanatory view showing a method for connecting optical connectors to each other, using an optical connector housing proposed in the prior art.
Figure 15:
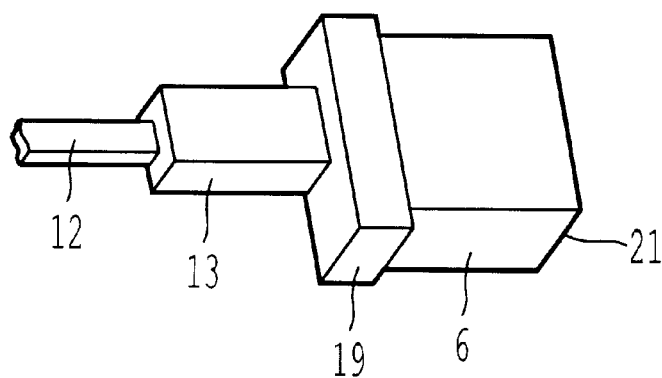
FIG. 15 is an explanatory view showing an MT optical connector.

Also, the connection structure shown in FIG. 13 is shown in a disassembled state, using an image view in which the connection structure shown in FIG. 7 and FIG. 8 is applied to a connection between optical connectors and a plurality of connectors being objects to be connected, which are placed on the substrate 24 in parallel.

In FIG. 13, by assembling the upper part 50a of the connector casing to the lower part 50b thereof, a connector casing shown in FIG. 8 can be formed. A ferrule (not illustrated) secured in the connector casing 50 is connected to the ferrule 6 of the optical connector 10. Besides, by providing a cover 25 so that the positions A and B shown in FIG. 13 are brought into contact with each other, it is possible to make the connection between the optical connector 10 and the optical connectors being objects to be connected more reliable.

Furthermore, in each of the above mentioned preferred embodiments, although the claw 4 is provided, as an engaging portion, at the tip end side of the arm portions 1 of the optical connector housing 3, the engaging portion is not necessarily the claw 4. Also, in the first and second preferred embodiments, a recess 14 is provided at the optical modules 14 as a portion to be engaged, which is engaged in the engaging portion, and in the third preferred embodiment, a claw 51 to be engaged is provided in the connector casing 50. However, the portion to be engaged is not necessary the recess 14 or the claw 51 to be engaged.

Further, in the respective preferred embodiments described above, although the tip end of the arm portions 1 of the optical connector housing 3 extends forward from the connection end face 21 of the ferrule 6, the tip end of the arm portions 1 of the optical connector housing 3 may be provided rearward from the connection end face 21 in the case where the position of the portion to be engaged at the object side to be connected extends midway of the ferrule 6 or at the rear end side. However, as shown in the respective embodiments, extending the tip end of the arm portions 1 forward from the connection end face 21 of the ferrule 6 provides a better connection between the optical connector 10 and objects to be connected.

Also, in the respective preferred embodiments, a description was given of the examples of connecting an optical connector 10 and optical modules 11 to each other, and connecting an optical connector 10 to another connector at the side of objects to be connected. However, an optical connector according to the invention is not necessarily connected to optical modules and a connector at the side of objects to be connected, but optical components being objects to be connected to the optical connector may be adequately set.

Figure 12:
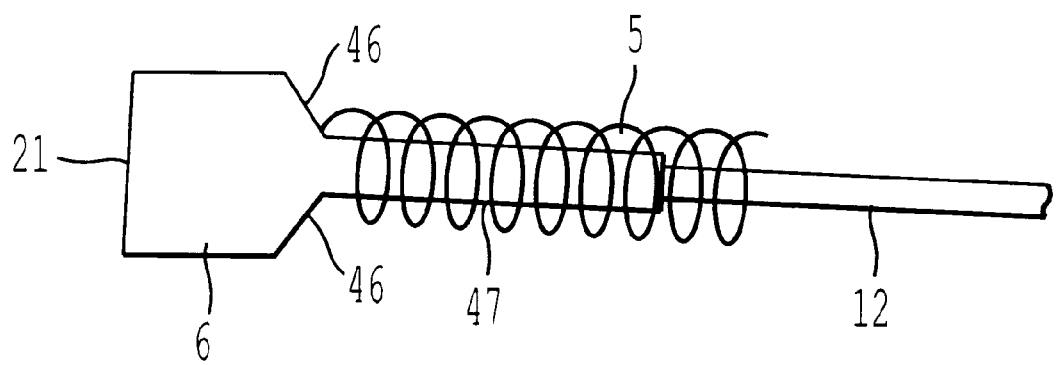
FIG. 12 is an explanatory view showing still another example of a ferrule construction applied to an optical connector using an optical connector housing according to the invention.

Further, the optical connector applied to the invention does not necessarily have an MT type ferrule. For example, as shown in FIG. 12, it may be of such a type in which the ferrule 6 is provided with an optical fiber protection portion 47. In the case where the ferrule is of such a type, for example, as shown in FIG. 12, the spring 5 may be provided on the outer circumferential side of the optical fiber protection portion 47. And, in this case, it is constructed such that, when pulling the ferrule 6 rearwards, the tapered portion 46 of the ferrule 6 is brought into contact with the surface 9 of the angle widening drive cam formed at the arm portions 1 of the optical connector housing 3 and moves along the surface 9 of the corresponding angle widening drive cam. By means of the tapered portion 46 of the corresponding ferrule 6 moving along the surface 9 of the angle widening drive cam, the arm portions 1 are widened, thereby enabling disconnection of the optical connector 10 from optical components being objects to be connected.

Still further, the ferrule 6 of an optical connector applied to the invention may be a single-fiber cylindrical ferrule. At this time, when aligning the ferrules to each other, a sleeve may be used as in the prior arts.

As described above, the invention relates to an optical connector housing by which connection of an optical connector to objects to be connected, and disconnection of the optical connector from the objects can be easily carried out, an optical connector using the same optical connector housing, and a connection structure between an optical connector using the same optical connector housing and optical components, whereby the invention is very applicable to cases where an optical connector is connected to optical components at a high integration density.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters Patent of the United States is:

1. An optical connector comprising:
    an optical connector housing having arm portions extending from both end sides of a face of a base end side, in which a space between said arm portions forms a ferrule accommodation space;
    an engaging portion configured to engage an object to be connected at a tip end side of respective arm portions; and
    an angle widening drive cam configured to widen the space between the arm portions when a ferrule is drawn to the face of the base end side, and having a protruding surface that protrudes from an inner wall of said arm portions and that extends from a position of a rear end face of said ferrule accommodated in said ferrule accommodation space to the base end side of the optical connector housing.

2. An optical connector according to claim 1, wherein the ferrule is accommodated in the ferrule accommodation space of said optical connector housing, and a resilient body which presses said ferrule to the object to be connected is provided from the rear end face of said ferrule to the face of the base end side of the optical connector housing.

3. An optical connector according to claim 2, wherein an optical fiber protection housing is provided so that an optical fiber ribbon led out from the rear end side of the ferrule accommodated in the ferrule accommodation space of the optical connector housing is placed between both sides thereof, or so that an outer circumferential surface thereof is covered, wherein said optical fiber protection housing is provided in said optical connector housing in a state such that the protection housing does not come out, and in a state where the protection housing can advance and retract in an extending direction of the arm portions of said optical connector housing, and
wherein a cam surface contacting portion, which, when pulling said optical fiber protection housing rearwards, is brought into contact with a surface of the angle widening drive cam of the arm portions of said optical connector housing and drives to open or widen the optical connector housing, is formed in said optical fiber protection housing so as to protrude toward said arm portion side.

4. An optical connector according to claim 3, wherein a ferrule stopping portion which is engaged with or in a flange portion or a recess formed on said ferrule is provided on the optical fiber protection housing.

5. An optical connector according to claim 3, wherein a ferrule stopping portion which is engaged with or in a flange portion or a recess formed on said ferrule is provided on the optical fiber protection housing.

6. An optical connector according to claim 2, wherein tip end portions of the arm portions of the optical connector housing extend forward beyond a connection end face of said ferrule.

7. An optical connector according to claim 6, wherein an optical fiber protection housing is provided so that an optical fiber ribbon led out from the rear end side of the ferrule accommodated in the ferrule accommodation space of the optical connector housing is placed between both sides thereof, or so that an outer circumferential surface thereof is covered,
wherein said optical fiber protection housing is provided in said optical connector housing in a state such that the protective housing does not come out, and in a state where the protective housing can advance and retract in an extending direction of the arm portions of said optical connector housing, and
wherein a cam surface contacting portion, which, when pulling said optical fiber protection housing rearwards, is brought into contact with a surface of the angle widening drive cam of the arm portions of said optical connector housing and drives to open or widen the optical connector housing, is formed in said optical fiber protection housing so as to protrude toward said arm portion side.

8. A connection structure between an optical connector and an optical component, wherein the optical connector comprises:
   an optical connector housing having arm portions extending from both end sides of a face of a base end side, in which a space between said arm portions forms a ferrule accommodation space;
   an engaging portion configured to engage an object to be connected at a tip end side of respective arm portions; and
   an angle widening drive cam configured to widen the space between the arm portions when a ferrule is drawn to the face of the base end side, and having a protruding surface that protrudes from an inner wall of said arm portions and that extends from a position of a rear end face of said ferrule accommodated in said accommodation space to the base end side of the optical connector housing,
   wherein the ferrule is accommodated in the ferrule accommodation space of said optical connector housing, and a resilient body which presses said ferrule to the object to be connected is provided from the rear end face of said ferrule to the face of the base end side of the optical connector housing, and
   wherein, when the ferrule is drawn to the rear end side of the arm portion against the pressing force of the resilient member, the rear end portion of the ferrule moves along a surface of the angle widening drive cam to cause the arm portions to be widened, and by said engaging portion being disengaged from said portion to be engaged, the optical connector is disconnected from said optical component.

9. A connection structure according to claim 8,
   wherein a plurality of optical fibers are disposed in parallel in the ferrule of the optical connector, and optical components being objects to be connected are arrayed and formed on a substrate in an erect state in a form of an array along a surface of said substrate, and
   wherein said optical components and said optical connector are detachably connected to each other so that the plurality of optical fibers of said respective optical connector are arrayed in a perpendicular direction with respect to the surface of said substrate.

10. A connection structure according to claim 8,
    wherein a plurality of optical fibers are disposed in parallel in the ferrule of the optical connector, section guiding walls are arrayed and formed on a substrate in an erect state in a form of an array along a surface of said substrate, optical components being objects to be connected are disposed in an erect state between respective section guiding walls, and tip end sides of the respective section guiding walls protrude forward from connection end faces of said optical components being objects to be connected, so that the tip end sides become an optical connector insertion guide, and said optical connectors are guided by and inserted into said optical connector insertion guide, and
    wherein said optical components are detachably connected to said optical connector.

11. A connection structure between an optical connector and an optical component, wherein the optical connector comprises:
    an optical connector housing having arm portions extending from both end sides of a face of a base end side, in which a space between said arm portions forms a ferrule accommodation space;
    an engaging portion configured to engage an object to be connected at a tip end side of respective arm portions; and
    an angle widening drive cam configured to widen the space between the arm portions when a ferrule is drawn to the face of the base end side, and having a protruding surface that protrudes from an inner wall of said arm portions and that extends from a position of a rear end face of said ferrule accommodated in said ferrule accommodation space to the base end side of the optical connector housing,
    wherein the ferrule is accommodated in the ferrule accommodation space of said optical connector housing, and a resilient body which presses said ferrule to the object to be connected is provided from the rear end face of said ferrule to the face of the base end side of the optical connector housing,
    wherein an optical fiber protection housing is provided so that an optical fiber ribbon led out from the rear end side of the ferrule accommodated in the ferrule accommodation space of the optical connector housing is placed between both sides thereof, or so that an outer circumferential surface thereof is covered,
    wherein said optical fiber protection housing is provided in said optical connector housing in a state such that the protection housing does not come out, and in a state where the protection housing can advance and retract in an extending direction of the arm portions of said optical connector housing,
    wherein a cam surface contacting portion, which, when pulling said optical fiber protection housing rearwards, is brought into contact with a surface of the angle widening drive cam of the arm portions of said optical connector housing and drives to open or widen the optical connector housing, is formed in said optical fiber protection housing so as to protrude toward said arm portion side,
    wherein, when the optical fiber protection housing is drawn toward the rear end side thereof, the cam surface contacting portion of the optical fiber protection housing moves along the surface of an angle widening drive cam to cause the arm portions to be widened, and
    wherein, when said engaging portion is disengaged from said portion to be engaged, the optical connector is disconnected from the optical component.

12. A connection structure according to claim 11,
    wherein a plurality of optical fibers are disposed in parallel in the ferrule of the optical connector, and optical components being objects to be connected are arrayed and formed on a substrate in an erect state in a form of an array along a surface of said substrate, and
    wherein said optical components and said optical connector are detachably connected to each other so that the plurality of optical fibers of said respective optical connector are arrayed in a perpendicular direction with respect to the surface of said substrate.

13. A connection structure according to claim 11,
    wherein a plurality of optical fibers are disposed in parallel in the ferrule of the optical connector, section guiding walls are arrayed and formed on a substrate in an erect state in a form of an array along a surface of said substrate, said optical components being objects to be connected are disposed in an erect state between the section guiding walls, and tip end sides of the section guiding walls protrude forward from connection end faces of said optical components being objects to be connected, so that the tip end sides become an optical connector insertion guide, and said optical connectors are guided by and inserted into said optical connect or insertion guide, and wherein said optical components are detachably connected to said optical connector.

14. A connection structure between an optical connector and an optical component, wherein the optical connector comprises:

an optical connector housing having arm portions extending from both end sides of a face of a base end side, in which a space between said arm portions forms a ferrule accommodation space;

an engaging portion configured to engage an object to be connected at a tip end side of respective arm portions; and an angle widening drive cam configured to widen the space between the arm portions when a ferrule is drawn to the face of the base end side, and having a protruding surface that protrudes from an inner wall of said arm portions and that extends from a position of a rear end face of said ferrule accommodated in said ferrule accommodation space to the base end side of the optical connector housing, wherein the ferrule is accommodated in the ferrule accommodation space of said optical connector housing, and a resilient body which presses said ferrule to the object to be connected is provided from the rear end face of said ferrule to the face of the base end side of the optical connector housing, wherein an optical fiber protection housing is provided so that an optical fiber ribbon led out from the rear end side of the ferrule accommodated in the ferrule accommodation space of the optical connector housing is placed between both sides thereof, or so that an outer circumferential surface thereof is covered, wherein said optical fiber protection housing is provided in said optical connector housing in a state such that the protection housing does not come out, and in a state where the protection housing can advance and retract in an extending direction of the arm portions of said optical connector housing, wherein a cam surface contacting portion, which, when pulling said optical fiber protection housing rearwards, is brought into contact with a surface of the angle widening drive cam of the arm portions of said optical connector housing and drives to open or widen the optical connector housing, is formed in said optical fiber protection housing so as to protrude toward said arm portion side, wherein a ferrule stopping portion which is engaged with or in a flange portion or a recess formed on said ferrule is provided on the optical fiber protection housing, and wherein, when the optical fiber protection housing is pulled rearward, the cam surface contacting portion of the optical fiber protection housing moves along the surface of the angle widening drive cam to cause the arm portions to be widened, and by said engaging portion being disengaged from the portion to be engaged, the optical connector is disconnected from an optical component.

15. A connection structure according to claim 14,
wherein a plurality of optical fibers are disposed in parallel in the ferrule of the optical connector, and optical components being objects to be connected are arrayed and formed on a substrate in an erect state in a form of an array along the surface of said substrate, and wherein said optical components and said optical connector are detachably connected to each other so that the plurality of optical fibers of said respective optical connector are arrayed in a perpendicular direction with respect to the surface of said substrate.

16. A connection structure according to claim 14,
wherein a plurality of optical fibers are disposed in parallel in the ferrule of the optical connector, section guiding walls are arrayed and formed on a substrate in an erect state in a form of an array along a surface of said substrate, optical components being objects to be connected are disposed in an erect state between the section guiding walls, and tip end sides of the section guiding walls protrude forward from connection end faces of said optical components being objects to be connected, so that the tip end sides become an optical connector insertion guide, and said optical connectors are guided by and inserted into said optical connector insertion guide, and wherein said optical components are detachably connected to said optical connector.

17. A connection structure between an optical connector and an optical component, wherein the optical connector comprises:

an optical connector housing having arm portions extending from both end sides of a face of a base end side, in which a space between said arm portions forms a ferrule accommodation space;

an engaging portion configured to engage an object to be connected at a tip end side of respective arm portions; and an angle widening drive cam configured to widen the space between the arm portions when a ferrule is drawn to the face of the base end side, and having a protruding surface that protrudes from an inner wall of said arm portions and that extends from a position of a rear end face of said ferrule accommodated in said ferrule accommodation space to the base end side of the optical connector housing, wherein tip end portions of the arm portions of the optical connector housing extend forward beyond a connection end face of said ferrule, and wherein, when the ferrule is drawn to the rear end side of the arm portion against the pressing force of a resilient member, the rear end portion of the ferrule moves along the surface of the angle widening drive cam to cause the arm portions to be widened, and by said engaging portion being disengaged from said portion to be engaged, the optical connector is disconnected from said optical component.

18. A connection structure according to claim 17,
wherein a plurality of optical fibers are disposed in parallel in the ferrule of the optical connector, and optical components being objects to be connected are arrayed and formed on a substrate in an erect state in a form of an array along the surface of said substrate, and wherein said optical components and said optical connector are detachably connected to each other so that the plurality of optical fibers of said respective optical connector are arrayed in a perpendicular direction with respect to the surface of said substrate.

19. A connection structure according to claim 17, wherein a plurality of optical fibers are disposed in parallel in the ferrule of the optical connector, section guiding walls are arrayed and formed on a substrate in an erect state in the form of an array along a surface of said substrate, optical components being objects to be connected are disposed in an erect state between respective section guiding walls, and tip end sides of the respective section guiding walls protrude forward from the connection end faces of optical components being objects to be connected, so that the tip end sides become an optical connector insertion guide, and said optical connectors are guided by and inserted into said optical connector insertion guide, and wherein said respective optical components are detachably connected to said optical connector.

20. A connection structure between an optical connector and an optical component, wherein the optical connector comprises:

an optical connector housing having arm portions extending from both end sides of a face of a base end side, in which a space between said arm portions forms a ferrule accommodation space;

an engaging portion configured to engage an object to be connected at a tip end side of respective arm portions; and an angle widening drive cam configured to widen the space between the arm portions when a ferrule is drawn to the face of the base end side, and having a protruding surface that protrudes from an inner wall of said arm portions and that extends from a position of a rear end face of said ferrule accommodated in said ferrule accommodation space to the base end side of the optical connector housing, wherein tip end portions of the arm portions of the optical connector housing extend forward beyond a connection end face of said ferrule, wherein an optical fiber protection housing is provided so that an optical fiber ribbon led out from the rear end side of the ferrule accommodated in the ferrule accommodation space of the optical connector housing is placed between both sides thereof, or so that an outer circumferential surface thereof is covered, wherein said optical fiber protection housing is provided in said optical connector housing in a state such that it does not come out, and in a state where it can advance and retract in an extending direction of the arm portions of said optical connector housing, wherein a cam surface contacting portion, which, when pulling said optical fiber protection housing rearwards, is brought into contact with the surface of the angle widening drive cam of the arm portions of said optical connector housing and drives to open or widen the optical connector housing, is formed in said optical fiber protection housing so as to protrude toward said arm portion side, wherein, when the optical fiber protection housing is drawn toward the rear end side thereof, the cam surface contacting portion of the optical fiber protection housing moves along the surface of an angle widening drive cam to cause the arm portions to be widened, and wherein, when said engaging portion is disengaged from said portion to be engaged, the optical connector is disconnected from the optical component.

21. A connection structure according to claim 20, wherein a plurality of optical fibers are disposed in parallel in the ferrule of the optical connector, and optical components being objects to be connected are arrayed and formed on a substrate in an erect state in a form of an array along a surface of said substrate, and wherein said optical components and said optical connector are detachably connected to each other so that the plurality of optical fibers of said respective optical connector are arrayed in a perpendicular direction with respect to the surface of said substrate.

22. A connection structure according to claim 20, wherein a plurality of optical fibers are disposed in parallel in the ferrule of the optical connector, section guiding walls are arrayed and formed on a substrate in an erect state in a form of an array along a surface of said substrate, optical components being objects to be connected are disposed in an erect state between respective section guiding walls, and tip end sides of the respective section guiding walls protrude forward from the connection end faces of optical components being objects to be connected, so that the tip end sides become an optical connector insertion guide, and said optical connectors are guided by and inserted into said optical connector insertion guide, and wherein said respective optical components are detachably connected to said optical connector.

23. A connection structure between an optical connector and an optical component, wherein the optical connector comprises:

an optical connector housing having arm portions extending from both end sides of a face of a base end side, in which a space between said arm portions forms a ferrule accommodation space;

an engaging portion configured to engage an object to be connected at a tip end side of respective arm portions; and an angle widening drive cam configured to widen the space between the arm portions when a ferrule is drawn to the face of the base end side, and having a protruding surface that protrudes from an inner wall of said arm portions and that extends from a position of a rear end face of said ferrule accommodated in said ferrule accommodation space to the base end side of the optical connector housing, wherein tip end portions of the arm portions of the optical connector housing extend forward beyond a connection end face of said ferrule, wherein an optical fiber protection housing is provided so that an optical fiber ribbon led out from the rear end side of the ferrule accommodated in the ferrule accommodation space of the optical connector housing is placed between both sides thereof, or so that an outer circumferential surface thereof is covered, wherein said optical fiber protection housing is provided in said optical connector housing in a state such that it does not come out, and in a state where it can advance and retract in an extending direction of the arm portions of said optical connector housing, and wherein a cam surface contacting portion, which, when pulling said optical fiber protection housing rearwards, is brought into contact with the surface of the angle widening drive cam of the arm portions of said optical connector housing and drives to open or widen the optical connector housing, is formed in said optical fiber protection housing so as to protrude toward said arm portion side, wherein a ferrule stopping portion which is engaged with or in a flange portion or a recess formed on said ferrule is provided on the optical fiber protection housing, and wherein, when the optical fiber protection housing is pulled rearward, the cam surface contacting portion of the optical fiber protection housing moves along the surface of the angle widening drive cam to cause the arm portions to be widened, and by said engaging portion being disengaged from the portion to be engaged, the optical connector is disconnected from an optical component.

24. A connection structure according to claim 23, wherein a plurality of optical fibers are disposed in parallel in the ferrule of the optical connector, and optical components being objects to be connected are arrayed and formed on a substrate in an erect state in a form of an array along the surface of said substrate, and wherein said optical components and said optical connector are detachably connected to each other so that the plurality of optical fibers of said respective optical connector are arrayed in a perpendicular direction with respect to the surface of said substrate.

25. A connection structure according to claim 23, wherein a plurality of optical fibers are disposed in parallel in the ferrule of the optical connector, section guiding walls are arrayed and formed on a substrate in an erect state in a form of an array along a surface of said substrate, optical components being objects to be connected are disposed in an erect state between respective section guiding walls, and tip end sides of the respective section guiding walls protrude forward from the connection end faces of optical components being objects to be connected, so that the tip end sides become an optical connector insertion guide, and said optical connectors are guided by and inserted into said optical connector insertion guide, and wherein said respective optical components are detachably connected to said optical connector.

* * * * *